United States Patent [19]

Imperi

[11] Patent Number: 4,871,306
[45] Date of Patent: Oct. 3, 1989

[54] AUTOMATIC MOULD UNLOADER FOR HAMS AND THE LIKE

[75] Inventor: Giovanni Imperi, Cecchian Di Albano, Italy

[73] Assignee: Cesare Fiorucci S.p.A., Italy

[21] Appl. No.: 260,502

[22] Filed: Oct. 20, 1988

[30] Foreign Application Priority Data

Nov. 16, 1987 [IT] Italy ............................... 48617 A/87

[51] Int. Cl.⁴ ...................... A22C 17/00; B29C 41/42
[52] U.S. Cl. ................................. 425/437; 100/910; 425/438; 425/439; 425/443; 425/451; 425/451.3
[58] Field of Search ............... 100/910, 260, 261, 262; 99/351; 425/439, 436, 436 RM, 437, 438, 443, 451, 451.3

[56] References Cited

U.S. PATENT DOCUMENTS

| 1,956,192 | 1/1889 | Donnelly | 425/439 |
| 3,206,534 | 9/1965 | Vögele et al. | 425/436 |
| 4,063,866 | 12/1977 | Lurbiecki | 425/517 |
| 4,406,608 | 9/1983 | Kataishi et al. | 425/436 RM |
| 4,534,286 | 8/1985 | Franzke | 100/219 |

FOREIGN PATENT DOCUMENTS

| 1213004 | 3/1960 | France | 100/910 |
| 1334429 | 11/1963 | France | |
| 2387609 | 11/1978 | France | |
| 2483183 | 12/1981 | France | |
| 2553333 | 4/1985 | France | |

Primary Examiner—Jay H. Woo
Assistant Examiner—Khanh P. Nguyen
Attorney, Agent, or Firm—Samuels, Gauthier, Stevens & Kehoe

[57] ABSTRACT

A mould unloader is disclosed for hams and the like which performs in a fully automatic way the operation of removing the lid (4), overturning the open mould (5) containing the product (6), removing the mould, conveying and evacuating the unloaded product and the empty containers the mould unloader includes, in a sequence along a horizontal working line, a first station (1) that carries out the operations of unhooking and removing the lid from the above, an overturnable flap (2) for overturning the container with the product in it, and a second station (3) for removing the mould from the above, said unloader also including means for collecting and evacuating the empty containers, said means being arranged laterally with respect to said horizontal working line.

18 Claims, 4 Drawing Sheets

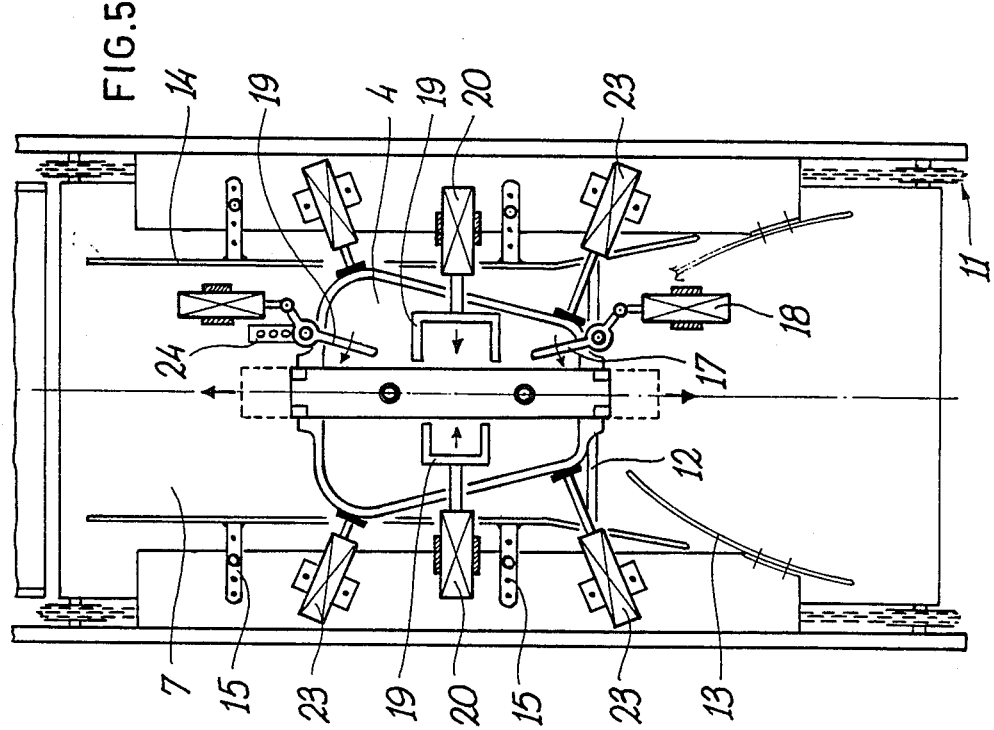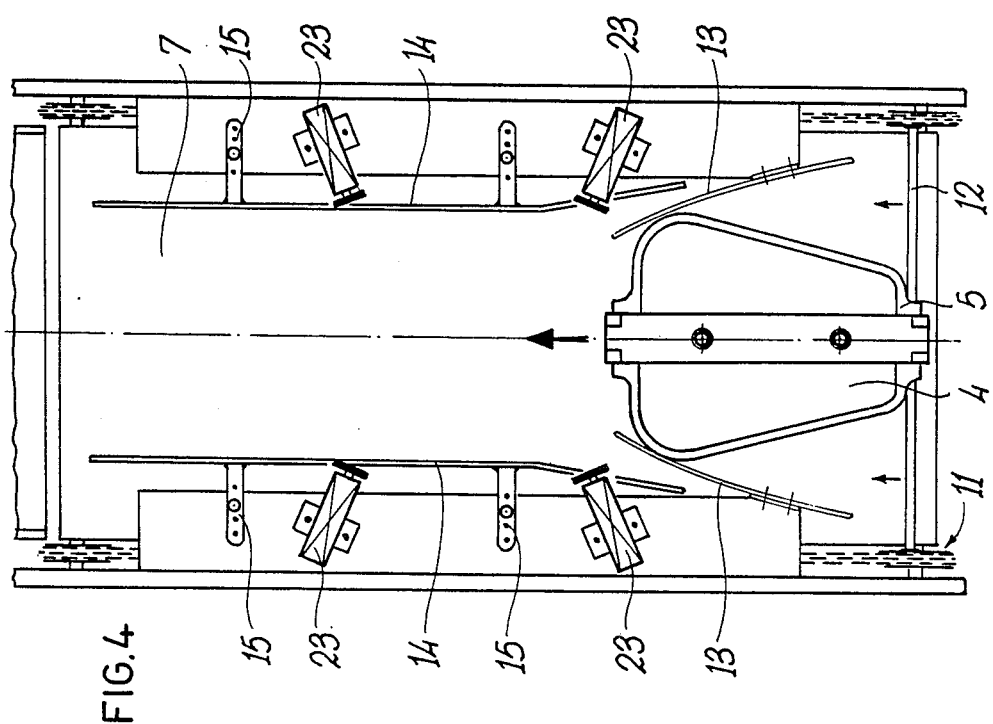

AUTOMATIC MOULD UNLOADER FOR HAMS AND THE LIKE

BACKGROUND OF THE INVENTION

1. Field of the Invention

The present invention relates to a machine for unloading hams and the like from the moulds. More particularly, the present invention relates to a machine that performs in a fully automatic way all operations that are required for removing hams and the like from the moulds in which such products are usually cooked.

2. Description of the Related Art

As is well known to those who are skilled in the art, hams and all other similar meat products are cooked within suitable moulds which are similar to pots or kettles provided with a pressure-tight lid. In such containers, whose general structure is actually standardized, the lid is of such size as to fit freely between the vertical walls of the mould, so that the lid itself rests directly on the product contained in the mould and presses the product by means of the pressure-hooking system.

Said hooking system consists of a horizontal crosspiece assembled above the lid, and bearing at its two ends two hinged arms having a rack-shaped profile facing the mould. The crosspiece is assembled on two fixed pillars on said lid and it is kept spaced from the lid itself by two helical springs inserted around said pillars; the rack-arms, at the very moment of closing, hook on the projecting rim of the mould with their teeth, and the closure is strongly secured by the two return helical springs which push said crosspiece upwards, thus forcing the two rack-arms into interference with the rim of the mould.

Though all moulds have the structure mentioned above, they are quite different by shape and sizes according to the meat product that is processed in the same: such moulds can be globally of a parallel-epipedal shape, or they can be roundish in various ways, and cross-piece of the lid in some versions can be provided with a shorter arm at right angles so as to form a Latin cross.

Although shapes and sizes are variable, being the hooking system of the lid unified, the operations required for removing the product from mould after cooking are in practice always the same: they consist in unhooking the racks from the projecting rim of the mould, which operation is made easier by exerting a pressure against the springs on said crosspiece, in removing said lid, and finally in unloading the product from the open container. This last operation is generally made difficult by the fact that the product adheres to the walls of the mould, so tha tit can be necessary to strike and shake the mould while in the upside down position; sometimes it is preferable to have recourse to the introduction of compressed air through a hole which is usually provided in the bottom of the mould.

The mould unloading operation of hams and the like is carried out at the present time generally by hand, and it is very laborious and even dangerous. In all cases such operation needs quite a large amount of manpower in order to keep the working times on the same levels of the other productive steps. Owing to the high resistance exerted by the return springs, those who are in charge of that operation have to make use of a hammer or the like for striking the cross-piece in order to cause the racks to release themselves and then, once the lid is removed, they have to unload energetically the ham from the mould.

Various automatic methods have been suggested in the past for carrying out the mould unloading operation of hams and the like by means of machines suitably designed, so as to avoid or reduce the difficulties in connection with the manual operations.

For instance, the machines disclosed in the French patents Nos. 1,255,857; 1,334,429 and 2,387,609 are capable of removing the product from the moulds when they are already free from their lids and in the upside down position, whereas the preceding operations of removing the lids and of turning the moulds upside down are kept manual: this one appears to be just a partial solution to the problem in question.

The machine disclosed in the French Pat. No. 2,553,333, on the contrary, carries out automatically all the necessary operations starting from the closed mould, up to the evacuation of the products and of the empty containers. However, it is to be remarked that the removal of the ham from the open mould is not carried out by the action of gravity, through turning the open mould upside down, but it is obtained through a procedure which is surely less valid, which consists in lifting the ham out of the open mould by clamping it by means of a sucker provided with air suction.. This type of gripping being very weak, also taking into consideration the remarkable weight of the product to be lifted, it is impossible not to remark that such system is strongly unreliable.

Another patent regarding that subject, i.e., the Italian Pat. No. 1,128,810, teaches a machine for mould unloading of hams and the like which carries out sequentially the operations of: unhooking and removing the lid, turning the mould upside down, removing the product by extracting the same from the mould by the action of gravity and with the help of insufflation of compressed air through the above-mentioned hole in the bottom of the mould, and evacuating the unloaded product from the mould as well as the empty containers; Such machine performs a working cycle of a discontinuous type, as it subjects to the operations just one mould at a time, on which mould the machine performs sequentially the operations mentioned above. The further mould to be subjected to such process can only be accepted after the preceding empty container has been evacuated. Such feature, which makes the machine's productivity unacceptably low, derives from the structure of the apparatus itself: the fundamental element on which the machine's design is based is a "container", substantially in the shape of a U. the mould to be opened is housed and locked in said container, which is rotatable about a horizontal axis between an upright position in which the mould placed in it is deprived of its lid, and an upside down position in which the product drops out of the open mould onto an underlying conveyor. Said container is provided with a removable "adaptation block", that can be changed so as to fit with the particular kind of mould undergoing the process.

It is to be remarked that, once the product is unloaded from the mould, the empty mould goes back to the upright position together with the "container" of the machine, then it is discharged, and only at that moment another mould to be opened can be fed.

In order to obviate the drawback of the excessive slowness of the working rhythm, a variant is suggested by the same patent mentioned above consisting in a double "container", which is capable of accepting a mould in the upright position and simultaneously another one in the upside down position, two such moulds being opposite to one another with respect to the rotation axis of said "container". Such solution results in doubling the productivity with respect to the preceding design, but the structure of the machine, as well as the structure of the relative control diagram, which are already very complex, become further complicated.

In addition to the drawbacks already mentioned above, all the solutions disclosed have the drawback of being hardly adaptable to moulds of different shapes and sizes: for instance, in the case of the last machine disclosed above, if the type of the products to be processed is changed, the so-called "adaptation block" is to be changed. Sometimes the mechanical members for unhooking the lid are also to be changed, as the length of the crosspiece, and hence the distance between the two rack-arms, can change from a given mould type to another one.

SUMMARY OF THE INVENTION

Accordingly, the object of the present invention consists in providing a fully automatic machine for unloading hams and the like from the moulds, which machine is not affected by the drawbacks discussed above, and is characterized by a high productivity, an extreme adaptability to all types of moulds, as well as by a simple structure and a reliable operation.

Indeed, it is quite clear that a fully automated unloading step can be suggested as a valid and advantageous alternative to the manual operation only if the apparatus designed to that end gives all necessary warranties of good operation, easy employment and flexibility of application.

According to the present invention, a machine is suggested for removing hams and the like from moulds, said machine being of the type operating by overturning of the open mould and extracting the product by the action of gravity from below, in which machine the various subsequent operations are carried out on the mould along a continuous working line. Stated otherwise, said machine processes a number of moulds at the time, which moulds are carried sequentially along a horizontal direction and undergo the various operations progressively along said direction.

As soon as the mould enters the machine, it is deprived of its lid, which is unhooked and is grasped by a suitable head movable along a vertical line, said head being lowered onto the mould for the operation and then lifted so as to take the lid with itself. Then the mould, deprived of the lid, is pushed onto an overturnalbe flap which, through rotation, causes the container to drop upside down onto the table of the next station, which is at a lower position. The fall, which is partially free, and the consequent impact on the table, cause the product to detach from the mould so that it suffices to lift the mould by gripping the same by means of a suitable mechanical device, to obtain the unloading of the product from the mould. The product, left on the above-mentioned table, is pushed out of the machine and conveyed to the packing and shipping departments. For a more reliable operation, the mould unloading operation can be aided by insufflating compressed air through the hole in the bottom of the mould, in the known manner.

Both lids and the moulds, lifted by means of the respective gripping heads, are conveyed out of the main line and placed on collecting conveyors suitably arranged on the side of such line. Once the empty containers are evacuated by the machine, they are conveyed to the washing sections.

Accordingly, the present invention specifically consists in a machine for unloading hams and the like from their moulds, said machine performing in a fully automatic way the operations of removing the lid, overturning the opened mould with the product, removing the mould itself, conveying and evacuating the product unloaded from the mould and the empty containers, said machine being characterized in that it comprises, in a sequence along a horizontal working line, a first station for unhooking and removing the lid, an overturnalbe flap for turning the container with the product upside down, and a second station for removing the mould itself, the product unloaded from the mould being evacuated at one end of said working line, at the side opposite to the inlet of the closed moulds, conveyor means being provided laterally with respect to said working line for conveying and evacuating the empty containers.

The first station for unhooking and removing the lid comprises a horizontal table on which the mould rests, fixed gripping means which are capable of holding the mould during the step of unhooking and removing the lid, preferably constituted by two or more jacks, a movable head arranged above said table, said head being translatable along a vertical line, preferably driven by a double-action jack between and upper position and a lower operative position. Preferably, said first station also comprises driving means for driving the mould along the working line over said table, and guide means, which are adjustable according to the sizes of the moulds to be processed.

According to a specific embodiment of the invention, the movable head comprises a central pushing member capable of abutting on the crosspiece of the lid when said head is in the lower position so as to push said crosspiece downwards thus compressing the springs, two opposite movable hooks capable of moving the two rack-arms away from the rim of the lid, such hooks being each one rotatable about a vertical axis and driven by one or more double-action jacks, and means for gripping and holding the lid, which means are capable of hooking the lid's crosspiece, so that the lid can be lifted together with said head in the upward stroke of the same.

These last mentioned means for gripping and holding the lid preferably consist in a pair of wedge-shaped opposite forks which are alternatively movable by means of one or more jacks, between a receded position, in which they are spaced apart, and an advanced position, in which they are close to one another, the forks passing below the lid's crosspiece and hooking the crosspiece itself.

The relative distance between the two hooks for said rack-arms can be adjusted through simple operations so as to adapt the machine to moulds having crosspieces of different lengths.

Again according to the present invention the overturnalbe flap for overturning the open container is preferably made up of a plane that is sloping in the rest position, with the upper edge close to the table of the first station, and with the lower edge close to the table of the second station, which table is placed at a lower position. Said flap is hinged at its lower edge and is driven into rotation by a jack which is also suitably hinged; when an open mould is pushed onto the sloping flap, the latter rotates through an arc in the upward direction and pushes the container so that the same drops in the upside down position onto the table of the second station.

According to a further specific embodiment of the present invention, the second station for removing the mould comprises a horizontal table, and a movable head arranged above said table, said head being movable along a vertical line, preferably driven by a double-action jack. Preferably, said second station also comprises guiding and driving means for varrying the mould and the unloaded product through said second station.

The movable head of the second station comprises gripping means capable of holding the mould, which allow the same to be lifted together eith the head itself during its upward stroke, said means consisting preferably of two or more opposite jacks.

According to a preferred solution, said head also comprises means for insufflating compressed air through a hole drilled in the bottom of the mould, said means being connected through suitable pipes to a source of compressed air.

Both heads are translatable also along a horizontal line at right angles to the working line; that feature allows the lids and the empty moulds, gripped and taken away by the heads, to be placed on suitable conveyors provided sidewise with respect to the working line, said conveyors carrying the same out of the machine. Preferably, one only conveyor is employed both for lids and for moulds, said conveyor running parallel to said working line.

BRIEF DESCRIPTION OF THE DRAWINGS

The present invention will be disclosed in the following, for illustrative purposes only, with specific reference to the figures of the enclosed drawings wherein:

FIG. 4 is a schematic plan view of the lower part of the first station of the same machine, in a starting operative phase; and FIG. 5 is a schematic plan view of the lower part of the first station in a subsequent operative phase, in which some members of the head are also shown.

Description Of Preferred Embodiment

As can be remarked, the enclosed drawings show the machine in question just in a schematic form, in which the secondary structural details such as the supporting frame and the outer enclosing case are left out.

Figure 1:
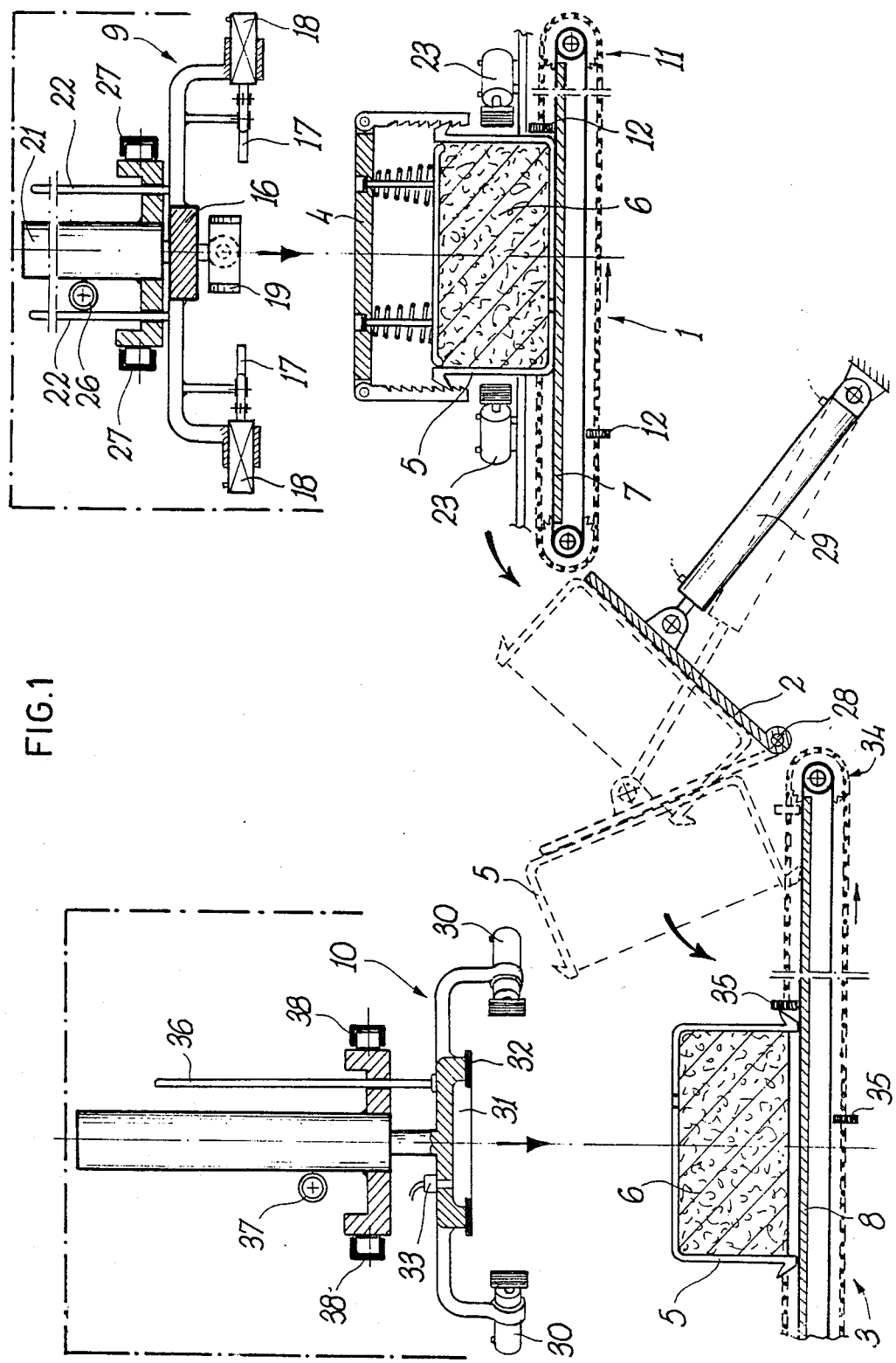
FIG. 1 is a schematic longitudinal cross-sectional view of a machine according to the present invention, in a first operating phase.
Figure 2:
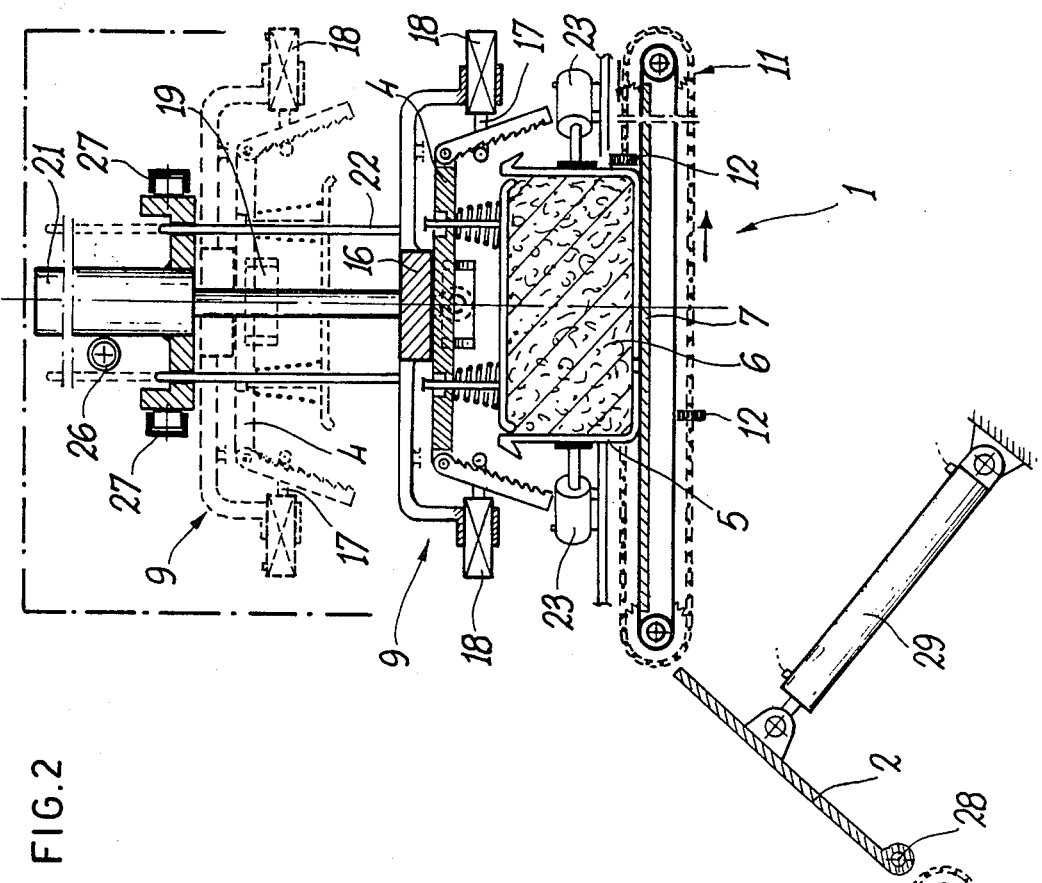
FIG. 2 is a schematic longitudinal cross-sectional view of the same machine, in a subsequent operating phase.
Figure 2:
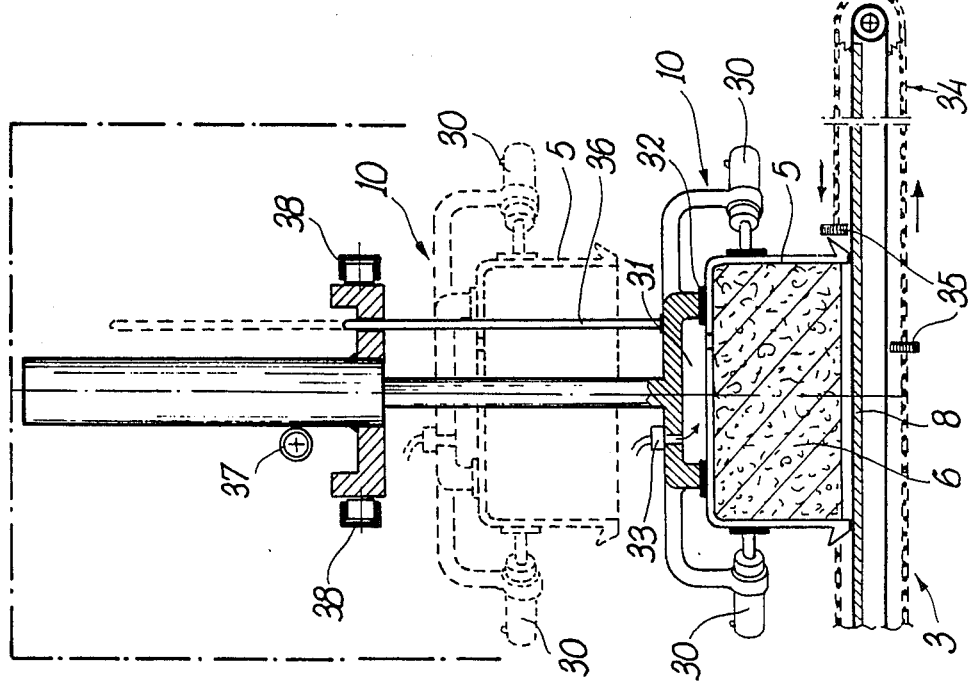

FIGS. 1 and 2 clearly show the first station 1 for performing the operations of unhooking and removing the lid, as well as the overturnable flap 2 for turning the open mould upside down and the second station 3 for removing the mould. The lids of the molds shown in the figures are indicated by the numeral 4, while the numeral 5 indicates the lower parts of the moulds, i.e. the proper moulds, in which the meat products 6 are contained.

The first and the second station respectively comprise the tables 7 and 8.

The two heads, respectively 9 and 10, are both shown in the upper position in FIG. 1 whereas they are shown in the lower position in FIG. 2, and, in said FIG. 2, they are shown by dashed lines again in the upper position but with the lid 4 or the mould 5 just as gripped and lifted.

Following the subsequent operations of the first station 1, in a first phase (FIG. 1) the mould to be processed has just been fed into the machine and the head 9 is still in the upper position.. The motion of the mould along the table 7 is obtained through chain driving means 11 which comprise a number of cross bars 12 that push said mould along the table 7.

The driving system (11, 12) is better shown in the plan view of FIG. 4, wherein there are also shown the guiding means, consisting of a first pair of elastic guides 13 and of two rigid guides 14 whose mutual distance can be adjusted in 15 so that they can be adapted to moulds of different sizes.

Figure 3:
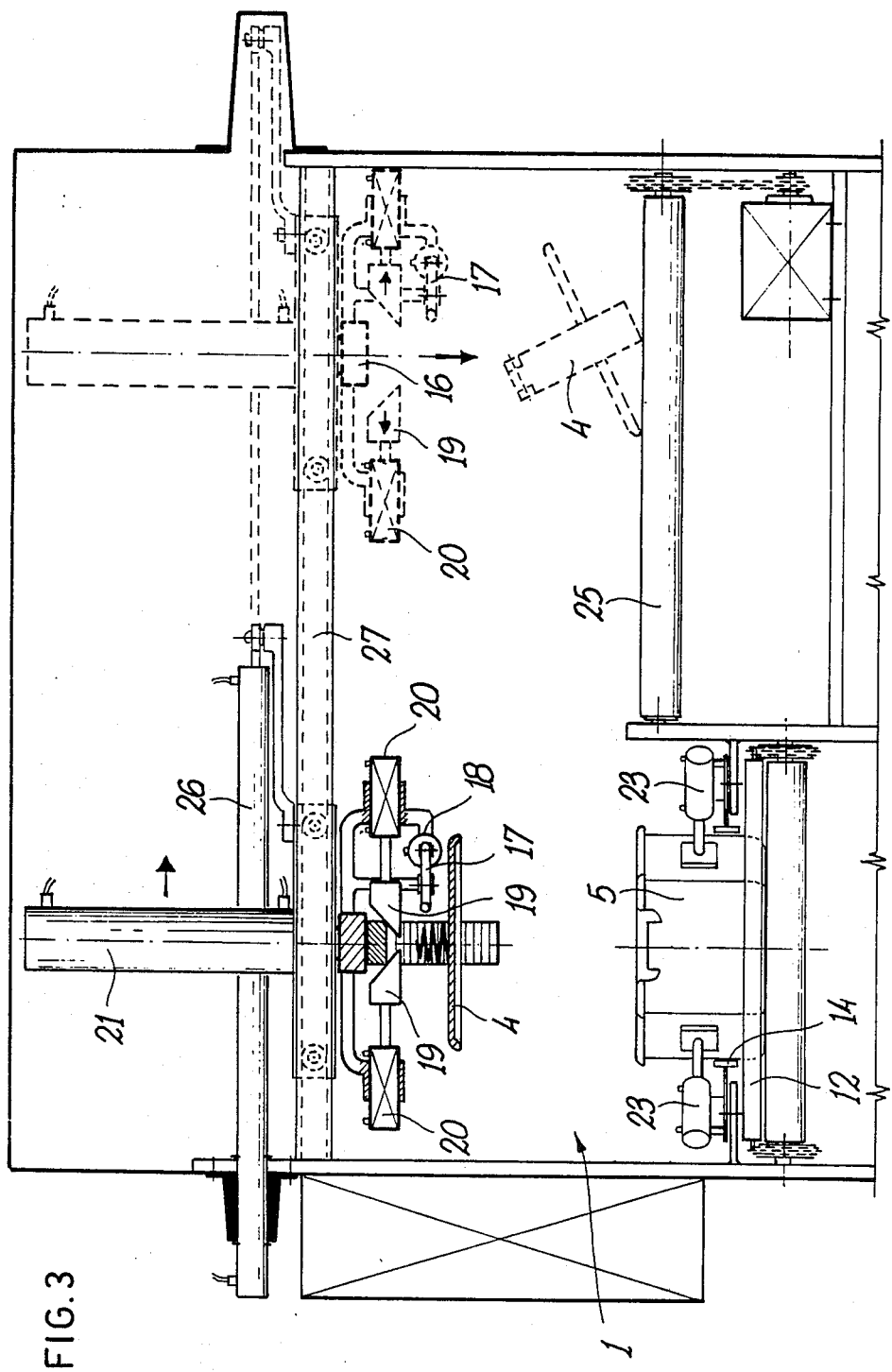
FIG. 3 is a schematic side view of the same machine from the right side with respect to FIGS. 1 and 2, wherein some members are shown partially cross-sectioned.

Coming back FIG. 1, the head 9 comprises a pushing member 16, the hooks 17 driven by the jacks 18 and the wedge-shaped forks 19 which are driven by the jacks 20 shown in FIG. 3 the head 9 is movable along a vertical line by means of a double-action jack 21; said motion is aided by the guiding rods 22 that keep the head from rotating about its axis.

The four jacks 23 (which are shown also in plan view in FIGS. 4 and 5) are fixedly connected to the table 7, said jacks performing the operation of gripping the mould and holding it during the removal of the lid from the same. In FIG. 2, the jacks 23 have already gripped the mould and the head 9 has been lowered onto the lid 4: the push member 16 forces the crosspiece downwards and compresses the springs so that the hooks 17 are able to take the rack-arms away from the rim of the mould 5. Simultaneously, the wedge-shaped forks 19 are introduced below said crosspiece so as to hook the same.

FIG. 5 shows from the above the very moment at which the mould has been gripped by the jacks 23 while the forks 19 and the hooks 17 of the head 9 are coming forward. Said figure also shows the adjusting system 24 for the adjustment of the mutual distance of the two hooks 17.

Once the lid 4 is unhooked, the head 9 goes upwards till reaching the position shown by dashed lines in FIG. 2: the lid hooked on the forks 19 is lifted together with the head 9. FIG. 3 also shows the same situation, the lid 4 being shown as transversely cross-sectioned: the only difference consists in that the hooks 17 have come back, so leaving the rack-arms free. At the point, the lid 4 is supported just by the forks 19, so that, when said forks recede, the lid is dropped. This occurs in the next phase, when the head 9 has shifted above the conveyor 25 for the empty containers, as shown by dashed lines in the same FIG. 3.

The motion of the head 9 in a direction at right angles to that of the working line is controlled by the double-action jack 26 and it occurs along the tracks 27. It is to be understood that any other driving system could have been provided to obtain such motion, such as for instance, a rack-rod system.

The mould 5, deprived of its lid, is then pushed onto the slopping flap 2 (see FIG. 1), which is hinged at the point 28, and said mould is turned upside down by the jack 29 onto the table 8 of the second station 3. FIG. 1 shows the very moment at which the mould containing the product is in place in the second station and the head 10 has not yet been lowered for starting its action. There are also shown the means for gripping the mould, said means consisting of the jacks 30 and the system for insufflating compressed air into the mould, said system being made up of the distributing element 31 provided with a gasket 32 and connected through the pipe 33 to a source of compressed air. It is to be observed that the elongated shape of the distributing element 31 allows air to be insufflated into moulds of various types in which the hole in the bottom can be at different positions.

Chain-like driving means 34 are also provided for the second station, together with transverse push bars 35. If necessary, guiding means can be also provided, for instance of the type of the elastic guides 13 of the first station.

FIG. 2 shows the head 10 in the operative position, with the jacks 30 gripping the walls of the mould 5. Simultaneously, compressed air is made to flow through the distributing element 31.

There after the head 10 is lifted (the vertical motion is aided by the guiding rod 36), it takes the mould 5 (shown in dashed lines) away and shifts, with a transverse motion similar to that shown for the head 9 in FIG. 3, driven by the jack 37 on the tracks 38, for dropping the mould on the conveyor 25.

In the variant embodiment shown in FIG. 3, the conveyor 25 is of such a width as to allow the lids 4 and the moulds 5 to be put at different distances from the working line, so that they do not interfere with one another. For instance, the stroke of the jack 26 will be correspondingly longer than that of the jack 37.

Once the product is unloaded from the mould 5 and is placed on the table 8, it is pushed out of the machine to be conveyed to the packing department.

The present invention has been disclosed for illustrative and not for limitative purposes, according to some preferred embodiments of the same, but it is to be understood that modifications and/or changes can be introduced in it by those who are skilled in the art without departing from the spirit and scope of the same.

I claim:

1. A mould unloader for moulds in which meat products are processed, said molds being closed by lids removably hooked thereto, said unloader comprising first, intermediate and second stations arranged sequentially along a working line, opening means at said first station for unlocking and removing said lids to thereby expose the products contained in said molds, overturning means at said intermediate station for overturning the thus opened molds containing said products, mold removal means at said second station for removing the thus overturned molds from said products, and means for transferring the thus removed molds from said second station.

2. A mould unloader according to claim 1, in which said opening means at said first station for unhooking and removing the lid comprises a horizontal table on which the mould rests, fixed gripping means for holding the mould during the step of unhooking and removing the lid, and a movable head arranged above said table and translatable along a vertical line between an upper position and a lower operative position, in which said head performs the operation of unhooking and gripping the lid.

3. A mould unloader according to claim 2, wherein said opening means at said first station for unhooking and removing the lid also comprises adjustable guiding means and driving means for carrying the mould through said first station over said table.

4. A mould unloader according to claim 2, wherein said gripping means are made up at least of two opposite jacks which are provided with pads at the ends of extendable rods for clasping the mould walls.

5. A mould unloader according to claim 2, wherein each lid has a crosspieces supporting hinged rack arms engageable with the rim of its respective mold, with return springs interposed between said lid and said crosspiece, and wherein said movable head comprises a central pushing member, capable of abutting on the crosspiece of the lid when said head is in the lower position, and of forcing said crosspiece downwards by compressing the return springs, two opposite movable hooks capable of taking the two rack-arms hinged on said crosspiece away from the rim of the mould, and means for gripping and holding said lid which are capable of hooking said crosspiece, so that the lid can be lifted together with said head in the upward stroke of the same.

6. A mould unloader according to claim 5, wherein said movable head is driven in a translation motion in along a vertical line by a double-action jack with a vertical axis.

7. A mould unloader according to claim 5 wherein said movable hooks for unhooking the rack-arms rotate each one about a vertical axis, and are driven by one or more jacks, the relative distance between said hooks being adjustable according to the length of the crosspiece of the lid to be processed.

8. A mould unloader according to claim 5, wherein said means for gripping and holding the lid consist of a pair of opposite wedge-shaped forks which are movable along a horizontal line and are driven by one or more jacks, between a receded position in which said forks are spaced apart and an advanced position in which said forks are close to one another and pass below the crosspiece of the lid so as to hook on the same.

9. A mould unloader according to claim 2, wherein said movable head of said first station can be translated also along a horizontal line at right angles to said horizontal working line, from the position above the mould to be opened to a position, shifted with respect to said line, above a conveyor for collecting and evacuating the lids.

10. A mould unloader according to claim 1, wherein said first station is at a level higher than said second station, and wherein said overturning means at said intermediate station for overturning the open container with the products includes an inclined overturnalbe flap having an upper edge close to said first station and a lower edge close to said second station, said flap being hinged at its lower edge, so as to be rotatable through an arc in the upward direction, thus causing the mold received thereon from said first station to turn over onto said second station.

11. A mould unloader according to claim 10, wherein said overturnable flap is made to rotate by a double-action jack having one end hinged thereto while the other end is hinged on a frame of the mould unloader.

12. A mould unloader according to claim 2, wherein said second station for removing the mould comprises a horizontal table and a movable head arranged above said table, which head is translatable along a vertical line between an upper position and a lower operative position, in which said head performs the operation of gripping mould.

13. A mould unloader according to claim 12, wherein said second station also comprises guiding means and driving means for carrying the mould and the product unloaded from the same through said second station over said table.

14. A mould unloader according to claim 12, wherein said movable head comprises gripping means capable of holding the mould so as to allow the same to be lifted together with the head itself in its return upward stroke.

15. A mould unloader according to claim 14, wherein said gripping means consist of at least two opposite jacks, which are provided with pads at the ends of extensible rods for clasping the mould.

16. A mould unloader according to claim 12, wherein said molds are provided with holes in the bottoms thereof, and wherein said moveable head also comprises means for insufflating compressed air through said holes, said means being connected through suitable pipes to a source of compressed air.

17. A mould unloader according to claim 12, wherein said movable head is driven in a translation motion along a vertical line by a double-action jack with a vertical axis.

18. A mould unloader according to claim 12, wherein said movable head of said second station can be translated also along a horizontal line at right angles to said working line, from the position above the mould to be removed to another positon, shifted with respect to said line, above a conveyor for collecting and evacuating the empty moulds.

* * * * *